(12) United States Patent
DeRosa et al.

(10) Patent No.: US 11,852,551 B2
(45) Date of Patent: *Dec. 26, 2023

(54) CLOG RESISTANT LOW PASS FILTER FOR A PRESSURE TRANSDUCER

(71) Applicant: KULITE SEMICONDUCTOR PRODUCTS, INC., Leonia, NJ (US)

(72) Inventors: Louis DeRosa, Saddle River, NJ (US); Robert Gardner, Westwood, NJ (US)

(73) Assignee: KULITE SEMICONDUCTOR PRODUCTS, INC., Leonia, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/678,378

(22) Filed: Feb. 23, 2022

(65) Prior Publication Data

US 2022/0178778 A1 Jun. 9, 2022

Related U.S. Application Data

(63) Continuation of application No. 17/002,025, filed on Aug. 25, 2020, now Pat. No. 11,280,693, and a
(Continued)

(51) Int. Cl.
| | | |
|---|---|---|
| *G01L 19/06* | (2006.01) | |
| *G01L 19/00* | (2006.01) | |
| *G01L 1/18* | (2006.01) | |

(52) U.S. Cl.
CPC ............ *G01L 19/0609* (2013.01); *G01L 1/18* (2013.01); *G01L 19/0007* (2013.01); *G01L 19/0636* (2013.01)

(58) Field of Classification Search
CPC ..... G01L 19/147; G01L 9/0042; G01L 19/04; G01L 9/0054; G01L 9/0072; G01L 13/025; G01L 19/14; G01L 19/0038; G01L 19/0084; G01L 9/0055; G01L 9/0075; G01L 19/0069; G01L 9/0052; G01L 9/0073; G01L 19/0092; G01L 19/0618; G01L 19/0645; G01L 19/143;
(Continued)

(56) References Cited

U.S. PATENT DOCUMENTS

| | | |
|---|---|---|
| 4,866,988 A | 9/1989 | Brown |
| 4,995,263 A | 2/1991 | Stocker |
| | (Continued) | |

*Primary Examiner* — Andre J Allen
(74) *Attorney, Agent, or Firm* — Troutman Pepper Hamilton Sanders LLP; James E. Schutz; Mark Lehi Jones

(57) ABSTRACT

A reconfigurable pressure transducer assembly having an input tube filter assembly is provided. Multiple small inlet apertures of the transducer housing or input tube filter assembly may be utilized to filter particulate matter from the measurement media/fluid. The resonant frequency and dampening characteristics of the pressure transducer assembly may be configured by the input tube filter assembly such that temporary clogging of a portion of the small inlet apertures does not appreciably affect the resonant frequency and dampening characteristics. The input tube filter assembly includes one or more inserts disposed in an input tube channel, the one or more inserts including one or more apertures of selectable dimensions and extending therethrough from a first end to a second end. The one or more inserts define at least a filter aperture, and the input tube filter assembly is tunable by selection of the selectable dimensions of the one or more inserts.

20 Claims, 5 Drawing Sheets

Related U.S. Application Data continuation-in-part of application No. 16/400,474, filed on May 1, 2019, now Pat. No. 11,060,935.

(60) Provisional application No. 62/892,161, filed on Aug. 27, 2019.

(58) Field of Classification Search
CPC ............... G01L 9/0051; G01L 19/0007; G01L 19/0046; G01L 19/06; G01L 19/0627; G01L 19/0681; G01L 27/002; G01L 9/00; G01L 9/0041; G01L 9/0044; G01L 11/025; G01L 11/04; G01L 19/0023; G01L 19/0672; G01L 19/069; G01L 19/142; G01L 19/145; G01L 19/16; G01L 7/00; G01L 9/0047; G01L 9/06; G01L 9/065; G01L 9/12; G01L 11/02; G01L 13/00; G01L 15/00; G01L 19/0015; G01L 19/003; G01L 19/02; G01L 19/0609; G01L 19/083; G01L 19/10; G01L 19/148; G01L 27/005; G01L 7/08; G01L 7/082; G01L 7/163; G01L 7/166; G01L 9/0045; G01L 9/0048; G01L 9/006; G01L 9/007; G01L 9/0076; G01L 9/04; G01L 9/045; G01L 9/125; G01L 11/00; G01L 17/00; G01L 19/00; G01L 19/0076; G01L 19/08; G01L 19/141; G01L 19/146; G01L 1/142; G01L 1/2262; G01L 1/246; G01L 21/12; G01L 23/16; G01L 27/007; G01L 7/04; G01L 7/063; G01L 7/084; G01L 7/086; G01L 7/16; G01L 9/0002; G01L 9/0007; G01L 9/0016; G01L 9/0019; G01L 9/0022; G01L 9/0027; G01L 9/0033; G01L 9/0039; G01L 9/005; G01L 9/0058; G01L 9/0077; G01L 9/0079; G01L 9/008; G01L 9/0092; G01L 9/0095; G01L 9/025; G01L 9/08; G01L 9/085; G01L 9/105; G01L 9/14; G01L 9/16
USPC ..................................................... 73/700–756
See application file for complete search history.

(56) References Cited

U.S. PATENT DOCUMENTS

| | | |
|---|---|---|
| 4,995,265 A | 2/1991 | Stocker |
| 5,206,785 A | 4/1993 | Hukashima |
| 5,228,344 A | 7/1993 | Hojoh |
| 11,060,935 B2 | 7/2021 | DeRosa et al. |
| 2011/0107840 A1 | 5/2011 | Kurtz et al. |
| 2012/0011936 A1 | 1/2012 | Hurst et al. |
| 2014/0041457 A1 | 2/2014 | Kurtz et al. |
| 2014/0260519 A1 | 9/2014 | Hurst et al. |

CLOG RESISTANT LOW PASS FILTER FOR A PRESSURE TRANSDUCER

CROSS-REFERENCE TO RELATED APPLICATIONS

This application is a continuation of U.S. patent application Ser. No. 17/002,025, filed 25 Aug. 2020 and published as U.S. Patent Application Publication No. US20200393316 on 17 Dec. 2020. U.S. patent application Ser. No. 17/002,025 claims the benefit of U.S. Provisional Application No. 62/892,161, filed 27 Aug. 2019. U.S. patent application Ser. No. 17/002,025 is also a Continuation-in-Part of U.S. patent application Ser. No. 16/400,474, filed 1 May 2019, entitled "Pressure Transducer Assembly with Selectable Damping Inserts," and issued as U.S. Pat. No. 11,060,935 on 13 Jul. 2021. The contents of each of the above-referenced applications are hereby incorporated by reference in their entirety as if presented herein in full.

TECHNICAL FIELD

The disclosed technology relates to a pressure transducer assembly configured with a mechanical low pass resonator and a particulate filter having multiple passageways for the measurement media to enter the transducer.

BACKGROUND

The frequency response of pressure transducers can be critically important for many measurements. In some applications, it is important to have very fast response times such that transient pressure phenomena may be measured. However, in other applications, it may be important to slow down or reduce transients in the applied pressures to ensure the long-term survivability of the pressure transducer. In fuel and hydraulic systems, there is often a steady-state pressure that is important to monitor; however, in addition to this steady-state pressure, there may be dynamic pressure associated with pump ripple, valve opening, and closing, etc. The dynamic pressures may be many times the steady-state pressure and their frequencies are often such that they can excite the resonant frequency of the tubing and/or internal cavities of the pressure transducer. Such resonance excitation can further amplify the dynamic pressures and cause them to permanently damage the pressure transducer, particularly if the transducer is designed to monitor the relatively low static pressure. In some systems, a filter assembly may be placed at the inlet end of the transducer to eliminate the higher frequency ripples and leave static and quasi-static pressures intact. In certain designs, the filter can be used to reduce pressure resonances that can damage or reduce the lifespan of the pressure transducer. As discussed in U.S. Pat. Nos. 7,975,552, 9,500,533, 9,709,450, and 9,752,948, each assigned to Kulite Semiconductor Products, Inc. and incorporated herein by reference as presented in full, various filters have been designed for coupling with a pressure transducer to reduce resonances near the frequency of the pressure ripple.

There are many different transducer structures designed to mitigate these dynamic pressures. Adding a pressure snubber or resonator in front of the transducer is the most common way to control pressure amplitudes at certain frequencies. There are also transducer housing designs, such as described in U.S. Pat. No. 9,116,056 that can eliminate or reduce transients. Such transducer designs often rely on a single narrow path (with or without an in-line sintered/porous filter structure) in communication with a cavity to act as a Helmholtz resonator, with resonance characteristics designed such that high-frequency pressure components are attenuated. Such designs can work quite well, but a filter having a single path and/or an in-line porous filter can become clogged over time when particulates in the measurement media accumulate. Such a clogged path/filter can cause the transducer to malfunction.

BRIEF SUMMARY

The disclosed technology relates to pressure transducers and, in particular, to a pressure transducer assembly that includes a mechanical filter element having multiple machined passageways for which the measurement media may traverse. The filter element disclosed herein may enable a pressure transducer to operate reliably, even when a portion of the multiple passageways become blocked or clogged.

According to an example implementation of the disclosed technology, a transducer assembly is provided. The transducer assembly includes a housing that includes an input tube channel and a transducer cavity in communication with the input tube channel. The transducer assembly includes an input tube filter assembly disposed in the input tube channel and in communication with the transducer cavity. The input tube filter assembly includes one or more inserts disposed in the input tube channel, the one or more inserts include one or more apertures of selectable dimensions and extending therethrough from a first end to a second end. The one or more inserts define one or more of a filter aperture, a filter cavity, and a plurality of inlet apertures. The input tube filter assembly is selectively tunable by the selection and installation of the one or more inserts.

The disclosed technology includes a method for making a transducer assembly. The method can include providing a housing having an input tube channel in communication with a cavity channel, selecting one or more inserts, each of the one or more inserts comprising one or more apertures of selectable dimensions and extending therethrough from a first end to a second end; inserting the one or more selected inserts into the input tube channel to form a filter aperture; providing a header; mounting a sensing element to a header; and securing the header to a portion of the housing to define a cavity in communication with the cavity channel, the sensing element, and the filter aperture.

Other implementations, features, and aspects of the disclosed technology are described in detail herein and are considered a part of the claimed disclosed technology. Other implementations, features, and aspects can be understood with reference to the following detailed description, accompanying drawings, and claims.

DETAILED DESCRIPTION

Figure 1:
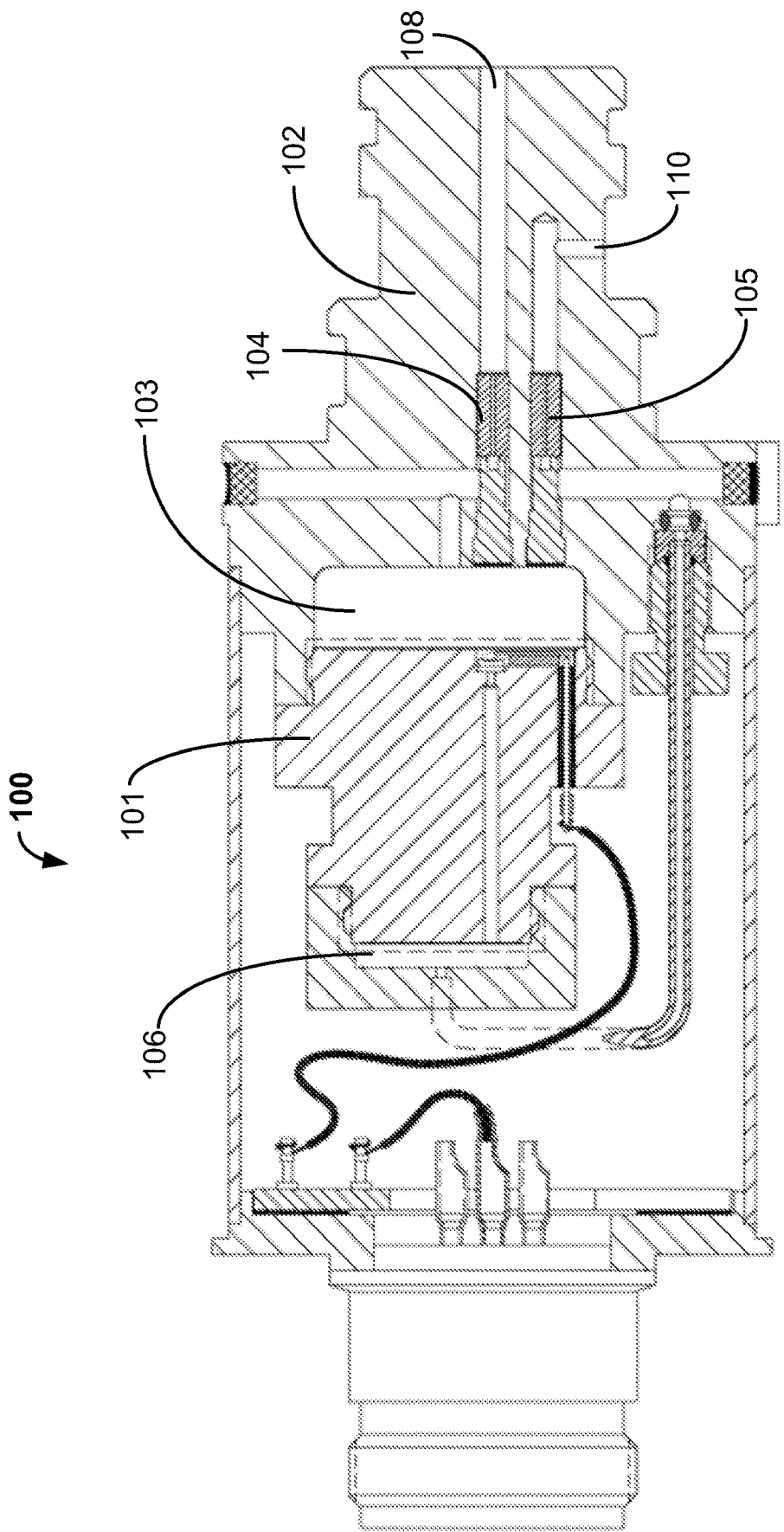
FIG. 1 depicts a standard pressure transducer 100 having a single narrow path and porous-type mechanical filter in line with the inlet tube.

Although many embodiments of the disclosed technology are explained in detail, it is to be understood that other embodiments are contemplated. Accordingly, it is not intended for the disclosed technology to be limited in scope to the details of construction and arrangement of components outlined in the following description or illustrated in the drawings. The disclosed technology is capable of other embodiments and of being practiced or carried out in various ways. Also, in describing the preferred embodiments, specific terminology will be resorted to for the sake of clarity.

As discussed herein, the term "filter" is intended to refer to a mechanical element that can prevent the passage of particles of a certain predetermined size and larger. As discussed herein, the term "resonator" is intended to refer to a structure having an inlet, an outlet, and a cavity therebetween, which may be used to control pressure phase and/or amplitude. An example resonator structure is a Helmholtz resonator, which may be utilized to attenuate certain pressure oscillation frequencies. The terms "filter" or "filtering" herein may refer to particulate blocking, even though the mechanical filter disclosed herein may form part of a resonator structure.

Referring now to the figures, in which like numerals represent like elements, certain example implementations of the disclosed technology are described herein. It is to be understood that the figures and descriptions have been simplified to illustrate elements that are relevant for a clear understanding, while eliminating, for purposes of clarity, many other elements found in typical pressure sensor assemblies and methods of making and using the same. Those of ordinary skill in the art will recognize that other elements may desirable and/or required for implementation. However, because such elements are well known in the art, and because they do not facilitate a better understanding of the disclosed technology, a discussion of such elements is not provided herein.

According to certain example implementations, a transducer assembly is disclosed for measuring one or more parameters or properties associated with an input condition stream. The term "condition stream" as used herein may refer to a measurement medium, such as a liquid or a gas. The transducer assembly may be configured to measure pressure and/or temperature associated with the condition stream. For example, in one illustrative embodiment, the transducer assembly may be configured to measure the dynamic and/or static oil pressure within a machine. In certain example implementations, the condition stream may include particulate matter. Certain example implementations of the disclosed technology may include features that can reduce, minimize, or eliminate particulate clogging within the transducer assembly.

Certain example implementations of the disclosed technology can include a transducer assembly having one or more multi-passageway filter elements disposed between the inlet port and the transducer element. In certain example implementations, the filter element may be part of a lowpass resonator, such as a Helmholtz resonator. In certain example implementations of the disclosed technology, the multiple passageways defined in the filter element may help reduce clogging, for example, due to particulates in the condition stream. According to an example implementation of the disclosed technology, the multiple passageways defined in the filter may be machined such that precise control of the passageway diameters may be achieved.

FIG. 1 depicts a standard pressure transducer 100 in which a mechanical filter element 104 is disposed in-line with the inlet tube 108 (with a similar filter element 105 shown disposed in-line with a reference port 110). In some designs, the mechanical filters 104 105 may be a sintered metal filter or another type of porous mechanical structure used to restrict the path of the fluid. In other designs, the mechanical filters 104 105 may include a single, small diameter path to restrict the path of the fluid. The filters 104 105 can be either brazed or press-fit in-line with the respective ports 108 110. In this example, a header 101 is welded onto the housing 102 to form a cavity 103. The restricted path, along with the cavity 103 forms a Helmholtz resonator. When the fluid viscosity is high enough (such as with fuel or hydraulic fluids) the resonator acts as a damper for high frequencies (typically over a few hertz). In some designs, the reference filter 105 may be disposed in the path of the reference port 110 and, together with the second cavity 106, may form another resonator structure. This allows for a differential measurement where both pressures are attenuated. Depending on the particular application this reference port 110 or filter 105 may or may not be necessary.

Those skilled in the art will appreciate that the system of equations describing the flow of pressure P through a pipe may be reduced to a wave equation in one dimension:

$$\frac{1}{c^2}\left(\frac{\partial^2 P'}{\partial t^2} + K\frac{32\mu}{\rho D^2}\frac{\partial P'}{\partial t}\right) = \frac{\partial^2 P'}{\partial x^2},$$

where c is the velocity of sound in the unconfined fluid (measurement media) and K is the fluid bulk modulus. The damping coefficient, $$K\frac{32\mu}{\rho D^2},$$

is dependent on both the pipe diameter D and viscosity (μ) of the media. With appropriate boundary conditions, the wave equation may be solved using Laplace transforms such that the frequency response of the pipe structure may be analytically estimated.

As the equation above illustrates, when the pressure flow is in an inlet tube having a large aspect ratio (for example, a smaller diameter D and long length L) the damping is increased. As the flow reaches the cavity (for example, cavity 103 in FIG. 1) of a set volume, the flow is further damped as the media expands to fill the cavity. By manipulating the diameter D and length L of the inlet tube and the volume of the cavity, the damping ratio, and cut-off frequency can be well tuned for the respective application. In this way, undesired ripple frequency can be substantially reduced or eliminated, while still retaining lower frequency components that are desirable to measure.

Using standard system dynamic analysis, an equation may be derived for the resonant frequency of the transducer assembly 100 model as shown in FIG. 1. The formula for the resonant frequency F may be expressed as:

$$F = \frac{\sqrt{(3\pi r^2 c^2 / 4LV)}}{2\pi},$$

where r is the internal radius of the inlet tube, c is the velocity of sound in the pressure media, L is the length of the inlet tube, and V is the volume of the cavity. When an inlet tube 108 and cavity 103 structure is tuned to match the pressure ripple frequency, the ripple pressure can be amplified and can exceed the pressure rating of the transducer, the housing, and/or other parts of the assembly 100. For example, exceeding the rated pressure can apply excessive stresses on the transducer die and cause the transducer to fail. Furthermore, a breach in the assembly 100 due to the excess pressure can allow contaminates from the dirty side of the filter to be passed to the clean side, thus destroying/contaminating the sensor and/or equipment downstream.

Referring again to FIG. 1, and as may be appreciated by inspection of the resonant frequency equation above, the increase in the resonant frequency is roughly proportional to a corresponding increase in the radius r for inlet tubes having a larger diameter D. However, as the inlet tube diameter D is decreased below about 1 mm (0.039") in diameter, capillary action can begin to take effect, reducing the corresponding change in resonant frequency, and resulting in diminishing returns of the reduction in the resonant frequency, and in some applications, making the inlet tube susceptible to clogging with the decreasing tube diameter D.

As may also be appreciated by inspection of the equation above, the resonant frequency F is also inversely proportional to the square root of the length L of the inlet tube and the volume V of the cavity. Therefore, the pressure ripple can be suppressed by increasing the inlet tube length L and/or increasing the volume V of the cavity. However, once the components of the transducer assembly 100 (such as the housing 102 and header 101) are manufactured, the ability to easily vary the inlet tube length L or the cavity volume V can be limited.

Figure 2:
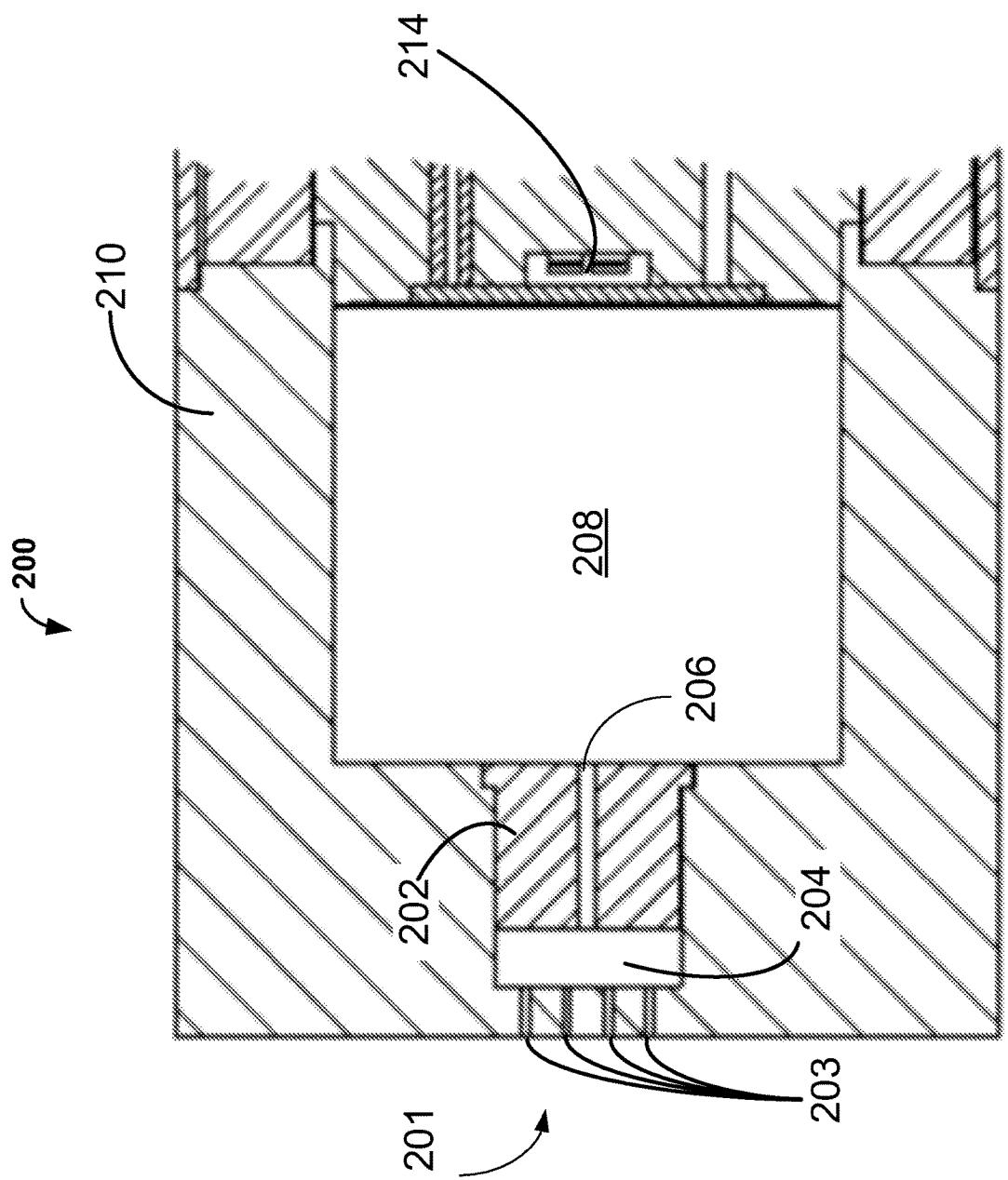
FIG. 2 illustrates a tunable pressure transducer assembly 200 including a filter having multiple inlet apertures, in accordance with exemplary embodiments of the disclosed technology.

FIG. 2 is a cross-sectional side-view illustration of a tunable pressure transducer assembly 200, in accordance with an exemplary embodiment of the disclosed technology. In contrast to previous filter implementations that utilize a single narrow inlet aperture, the pressure transducer assembly 200 disclosed herein may utilize multiple inlet apertures 203 having relatively small diameters, as will be discussed below. In certain implementations, the multiple inlet apertures 203 may be disposed at or near the inlet face 201 of the transducer assembly 200 such that they are in communication with the measurement media/fluid. Such an arrangement may help reduce clogging of the inlet apertures 203 and/or facilitate unclogging by the flow of the media/fluid across the inlet face, or by flow caused by a change in pressure of the system.

In certain exemplary implementations, the multiple inlet apertures 203 may receive and mechanically filter the pressure media/fluid present at the inlet face 201. In one exemplary implementation of the disclosed technology (as shown in FIG. 2) a transducer element 214 may measure the pressure of the media/fluid via the multiple inlet apertures 203, small filter cavity 204, filter aperture 206 defined in an insert 202, and a larger transducer cavity 208 in communication with the transducer element 214. While the implementation depicted in FIG. 2 shows an exemplary combination/sequence of apertures and cavities, it is to be understood that such a combination/sequence is not intended to limit the disclosed technology to a particular embodiment.

In accordance with certain exemplary implementations of the disclosed technology, the dimensions of the multiple inlet apertures 203 and the small filter cavity 204 may be configured such that they do not appreciably affect the overall frequency response of the pressure transducer assembly 200. In certain exemplary implementations, the cut-off frequency of the combined multiple inlet apertures 203 and the small filter cavity 204 may be configured with a much higher cut-off frequency than that of the combined filter aperture 206 and transducer cavity 208. In this respect, the frequency dynamics of the assembly 200 may be predominantly governed by the filter aperture 206 and transducer cavity 208.

In accordance with certain exemplary implementations of the disclosed technology, and as discussed above, the multiple inlet apertures 203 may be configured to have diameters ranging from about 0.005" to about 0.010". In some implementations, the diameter of the inlet apertures 203 may range from 0.005" to 0.006". In some implementations, the diameter of the inlet apertures 203 may range from 0.00" to 0.007". In some implementations, the diameter of the inlet apertures 203 may range from 0.007" to 0.008". In some implementations, the diameter of the inlet apertures 203 may range from 0.008" to 0.009". In some implementations, the diameter of the inlet apertures 203 may range from 0.009" to 0.010".

In certain exemplary implementations, the filter aperture 206 may be formed in an insert 202 piece that may be selected and inserted into the housing 210 to provide desired tuning/dampening based on the length (which may be used to define the volume of the cavity 204) and diameter of the aperture 206. In certain exemplary implementations, the insert can include a single aperture (or multiple apertures) having diameter(s) larger than diameters of the multiple inlet apertures 203, and typically ranging from 0.010" to 0.020". In some implementations, the diameter of the filter aperture(s) 206 may range from 0.01" to 0.012". In some implementations, the diameter of the filter aperture(s) 206 may range from 0.012" to 0.014". In some implementations, the diameter of the filter aperture(s) 206 may range from 0.014" to 0.016". In some implementations, the diameter of the filter aperture(s) 206 may range from 0.016" to 0.018". In some implementations, the diameter of the filter aperture(s) 206 may range from 0.018" to 0.02".

In accordance with certain exemplary implementations of the disclosed technology, the length of the filter aperture(s) 206 may be much greater than the length of the inlet apertures 203 so that the frequency response of the assembly 200 is governed by the filter aperture 206 and transducer cavity 208. For example, by configuring the inlet apertures 203 to have a much shorter length than the length of the filter aperture(s) 206, and by utilizing a smaller volume for the filter cavity 204 (compared with the transducer cavity 208), the combined inlet apertures 203 and filter aperture(s) 206 may have an associated resonance frequency that is higher than that of the combined filter aperture 206 and transducer cavity 208.

According to certain exemplary implementations of the disclosed technology, the length of the inlet apertures 203, the number of inlet apertures 203, and/or the volume of the filter cavity 204 may be configured so that one or more of inlet apertures 203 can become clogged without affecting the frequency response of the transducer assembly 200. For example, by configuring the diameter (e.g., 0.005") of the inlet apertures 203 to be smaller than the diameter (e.g., 0.007") of the filter aperture(s) 206. few if any particles large enough to clog the filter aperture(s) 206 will pass through the inlet apertures 203, making it much less likely for a clog to develop.

Figure 3:
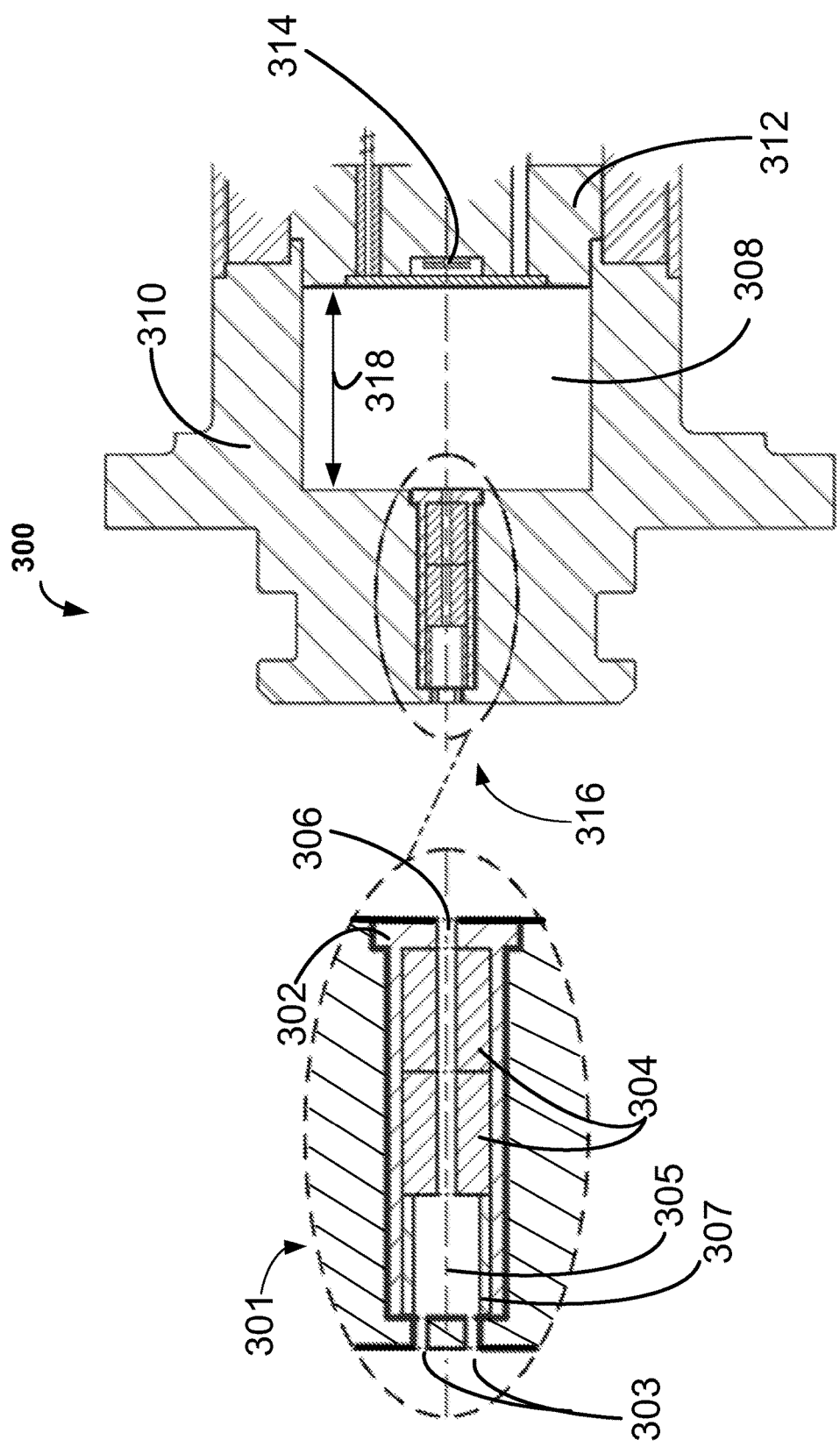
FIG. 3 illustrates a tunable pressure transducer assembly 300 including a detailed inset view of an exemplary filter assembly, in accordance with exemplary embodiments of the disclosed technology.

FIG. 3 depicts a cross-sectional side-view illustration of a tunable pressure transducer assembly 300, according to an exemplary implementation of the disclosed technology. The left-hand portion of FIG. 3 depicts an inset view illustrating an example input tube filter assembly 301 configured to accept one or more inserts 304 that may be selected to achieve the desired damping ratio and/or resonant frequency, for example, to avoid certain pressure ripple frequencies in the pressure media for a given measurement application. Certain example implementations of the disclosed technology may utilize an insert holder 302 to house the inserts 304.

In the exemplary embodiment shown in FIG. 3, multiple small diameter inlet apertures 303 may be utilized to mechanically filter particles from the pressure media/fluid (as discussed above with reference to FIG. 2). However, in this implementation, the filter cavity 305 may be formed with a cavity insert 307, and the filter aperture(s) 306 may be formed by a series of press-fit insert 304. This allows for easy reconfiguration of the aperture and cavity sizes for different applications such as increased or decreased frequency response or fluid parameters (density, viscosity, etc.).

As discussed above, pressure media being measured can comprise high-frequency pressure ripples that can interfere with the accuracy of the sensing element 314 and shorten its operable lifespan. The pressure transducer assembly 300 of the disclosed technology may be selectively tuned to achieve desired parameters via the configurable input tube filter assembly 301, for example, to eliminate undesirable high-frequency ripples while allowing desirable static and quasi-static pressures to pass and be measured by the sensing element 314.

In accordance with certain exemplary implementations of the disclosed technology, each of the inserts 304 may be manufactured to include one or more filter apertures 306 (i.e., apertures) extending therethrough from a first end to a second end. In certain exemplary implementations, each insert 304 may be manufactured with a corresponding filter aperture 306 having a diameter selected from a range of diameters, and machined/drilled separately from the housing 310. For example, the filter apertures 306 in each insert 304 may be precision drilled before being selected and installed such that the filter apertures 306 of the individual inserts 304 line-up with one another, resulting in an input tube having an effective length equal to the sum of the lengths of the corresponding inserts 304. In certain example implementations, an insert holder 302 may be utilized to house and/or constrain the one or more inserts 304.

According to certain example implementations, the typical ripple frequencies that may be dampened by the disclosed technology may range in frequency from about 500 Hz to about 3 kHz. According to an example implementation of the disclosed technology, a typical diameter of the filter apertures 306 of the inserts 304 can range from about 0.25 mm (0.01 in) to about 1.3 mm (0.05 in). According to an example implementation of the disclosed technology, a typical length of the (single or plural) inserts 304 can range from about 2.5 mm (0.1 in) to about 13 mm (0.5 in).

In accordance with certain example implementations of the disclosed technology, an aspect ratio for the inserts 304 may be defined as the length of the filter aperture 306 of the inserts 304 divided by the diameter of the filter apertures 306 of the inserts 304. In accordance with certain example implementations of the disclosed technology, the total aspect ratio (for the single and/or plural stacked inserts) may range from approximately 2 to approximately 50. In certain example implementations, two or more inserts 304 may be utilized when the total aspect ratio is greater than about 5. In certain implementations, two or more inserts 304 may be utilized when the total aspect ratio is greater than about 10.

According to certain exemplary implementations of the disclosed technology, the filter apertures 306 may be machined using various techniques, including but not limited to laser drilling, mechanical drilling, electrical discharge machining (EDM) drilling, etc. In certain example implementations, the inserts 304 may be manufactured to have aperture diameters in the range of about 100 microns to about 2 millimeters (about 0.004 in. to about 0.080 in.).

In certain exemplary implementations, the filter apertures 306 may be drilled so that the aperture diameters result in the range of about 100 microns to about 200 microns. In certain exemplary implementations, the filter apertures 306 may be drilled so that the aperture diameters result in the range of about 200 microns to about 300 microns. In certain exemplary implementations, the filter apertures 306 may be drilled so that the aperture diameters result in the range of about 300 microns to about 400 microns. In certain exemplary implementations, the filter apertures 306 may be drilled so that the aperture diameters result in the range of about 400 microns to about 500 microns. In certain exemplary implementations, the filter apertures 306 may be drilled so that the aperture diameters result in the range of about 500 microns to about 600 microns. In certain exemplary implementations, the filter apertures 306 may be drilled so that the aperture diameters result in the range of about 600 microns to about 800 microns. In certain exemplary implementations, the filter apertures 306 may be drilled so that the aperture diameters result in the range of about 800 microns to about 1 millimeter. In certain example implementations, the inserts 304 may be manufactured to have aperture diameters in the range of about 1 millimeter to about 1.3 millimeters. In certain example implementations, the inserts 304 may be manufactured to have aperture diameters in the range of about 1.3 millimeters to about 1.5 millimeters. In certain example implementations, the inserts 304 may be manufactured to have aperture diameters in the range of about 1.5 millimeters to about 2 millimeters. In this respect, the pressure transducer assembly 300 may be custom tuned by the selection and installation of the one or more inserts 304 to achieve the desired dampening ratio and/or cutoff frequency.

According to certain example implementations of the disclosed technology, the filter aperture 306 having the desired diameter may be formed by a series of press-fit inserts 304 that may be selected and stacked together to form an effective filter having the desired aperture diameter and length.

As depicted in the leftmost portion of the inset diagram of the input filter assembly 301, the multiple inlet apertures 303 may be machined/drilled in the housing 310 with dimensions selected independent of dimensions of the filter aperture 306. For example, the dimensions of the inlet apertures 303 may be sized based on factors such as the viscosity and/or particle size in the pressure medium, and/or to avoid clogging. In certain exemplary implementations, the length of inlet apertures 303 may be short enough that it has a negligible effect on the damping ratio and cut-off frequency of the resulting input filter assembly 301.

In certain exemplary implementations, the tunable pressure transducer assembly 300 may include a cavity 308 of fixed volume defined by the housing 310 and header 312 and may in communication with the aperture(s) 306 of the insert(s) 304. According to an exemplary implementation of the disclosed technology, a sensing element 314 may be mounted on the header 312 and configured to measure an applied pressure within the cavity 308, as at least partially filtered by the input filter assembly 301 via the corresponding insert(s) 304 307. The volume of the cavity 308 may be set by the dimensions of the housing 310 and/or the header 312, thus providing additional manufacturable parameters that may be utilized to provide desired tuning specifications of the assembly 300.

In accordance with certain exemplary implementations of the disclosed technology, an insert holder 302 may be utilized to constrain the one or more inserts 304. In certain example implementations, the insert holder 302 may be press-fit into the corresponding channel defined in the housing 310, and then the inserts 304 may be inserted into the insert holder 302. In other implementations, the inserts 304 may first be installed in the insert holder 302, which may then be press-fit into the corresponding channel defined in the housing 310. In certain exemplary implementations, the insert holder 302 may be further secured to the housing 310 using a weld. In certain exemplary implementations, the inserts 304 may be secured to the insert holder 302 using a weld, press-fit, etc. In certain example implementations, the inserts 304 and/or the insert holder 302 may be configured to be removable/replaceable so that the input filter assembly 301 can be selectively tuned for a given application.

Certain technical improvements, cost savings, and/or flexibility may be achieved by the disclosed technology. For example, the manufacturing process of the housing 310 can be decoupled from the precision manufacturing process of the inserts 304, thereby allowing different manufacturing tolerances for the housings 310 vs. the inserts 304. Furthermore, a batch of housings 310 manufactured with the same dimensions may be individually tuned by the selection of inserts 304. In certain exemplary implementations, the inserts 304 may be made from the same material as the housing 310, such as stainless steel or ceramic. In certain exemplary implementations, the inserts 304 may be machined/drilled from blanks such that any defect resulting from machining the aperture 306 therethrough will not necessitate discarding (or re-machining) an entire housing 310.

In accordance with certain exemplary implementations of the disclosed technology, and as depicted in the inset drawing of the input filter assembly 301 on the left-hand side of FIG. 3, multiple individual sections of the inserts 304 may be stacked to create a continuous aperture 306. In certain exemplary implementations, this multi-section stacking feature of the inserts 304 may result in a relatively long effective filtering aperture 306 without requiring drilling such a long, continuous aperture through the housing 310 (or through a long insert section) which may simplify the drilling process, improve the dimensional tolerance and/or improve the uniformity of the aperture 306.

In accordance with certain exemplary implementations of the disclosed technology, (and as discussed above with reference to FIG. 2) the dimensions of the multiple inlet apertures 303 and the small filter cavity 305 may be configured such that they do not appreciably affect the overall frequency response of the pressure transducer assembly 300. In certain exemplary implementations, the cut-off frequency of the combined multiple inlet apertures 303 and the small filter cavity 305 may be configured with a much higher cut-off frequency than that of the combined filter aperture 306 and transducer cavity 308. In this respect, the frequency dynamics of the assembly 300 may be predominantly governed by the filter aperture 306 and transducer cavity 308. Additionally, as discussed above with reference to FIG. 2, According to certain the number of inlet apertures 303, and/or the volume of the filter cavity 305 may be configured so that one or more of inlet apertures 303 can become clogged without affecting the frequency response of the transducer assembly 300. For example, by configuring the diameter (e.g., 0.005") of the inlet apertures 303 to be smaller than the diameter (e.g., 0.007") of the filter aperture(s) 306. few if any particles large enough to clog the filter aperture(s) 306 will pass through the inlet apertures 303, making it much less likely for a clog to develop.

In accordance with certain exemplary implementations of the disclosed technology, the housing 310 and/or header 312 may be configured with certain dimensions that can be controlled (during the initial manufacturing process and/or in a separate machining step) to result in a suitable volume of the cavity 308 for a given application and/or damping specification. Thus, certain implementations of the disclosed technology provide for additional process variables (in addition to selection and insertion of appropriate inserts 304 into the holder 302) that can be utilized to tune the assembly 300, for example, by controlling one or more dimensions 318 of the cavity 308 via the structure of the housing 310 and/or the configuration of the header 312.

In accordance with certain example implementations of the disclosed technology, the tunable transducer assembly 300 shown in FIG. 3 may also utilize the sensing element 314 to sense applied pressure by receiving incoming pressure media that is applied to the inlet apertures 303 of the housing 310, directed through the filter cavity 305, aperture 306 defined by the inserts 304, and then directed into the transducer cavity 308. According to certain exemplary implementations of the disclosed technology, the flow and frequency of the pressure media presented to the sensing element 314 may be altered by changing the dimensions of the low pass mechanical filter as defined at least by the dimensions of aperture 306 and the cavity 308. One skilled in the art will appreciate that the housing 310 and/or input port 316 can be customized to fit many configurations, for example, but not limited to, O-ring seals and threads.

One skilled in the art will appreciate that narrowing the aperture 306 (i.e., decreasing the diameter) enhances attenuation. However, if the aperture 306 is too narrow for the applied pressure media, desirable low-frequency components (e.g., static and quasi-static pressures) may also be eliminated, which may interfere with the accuracy of the sensing element 314. Conversely, if the aperture 306 is too wide, high-frequency ripples may not be sufficiently eliminated, which can also interfere with the accuracy of the sensing element 314 and decrease its operable lifespan.

In accordance with certain example implementations of the disclosed technology, micro-electrical discharge machining (EDM) may be utilized to drill the filter apertures 306 in the inserts 304 with high accuracy. Those having skill in the art of EDM may understand that the aspect ratio (length divided by diameter) of an aperture drilled by EDM can be greater than apertures machined by other processes such as etching, mechanical drilling, laser ablation, etc. However, the drilling speed of micro EDM can slow down or stop when the aspect ratio of an aperture reaches a certain value. In some instances, particularly with apertures having diameters on the order of 500 microns or less, it can be difficult to create apertures with an aspect ratio greater than about 10 due to phenomena such as secondary sparking, debris accumulation, etc. Such factors can limit the practical depth and processing speed for which an aperture 306 can be drilled in a single piece of material, such as metal or stainless steel.

To address some of the above-referenced limitations, and according to certain example implementations of the disclosed technology, multiple inserts 304 having the desired diameter filter apertures 306 may be selected and stacked together to form an effective input tube having the desired aperture diameter and length.

Figure 4:
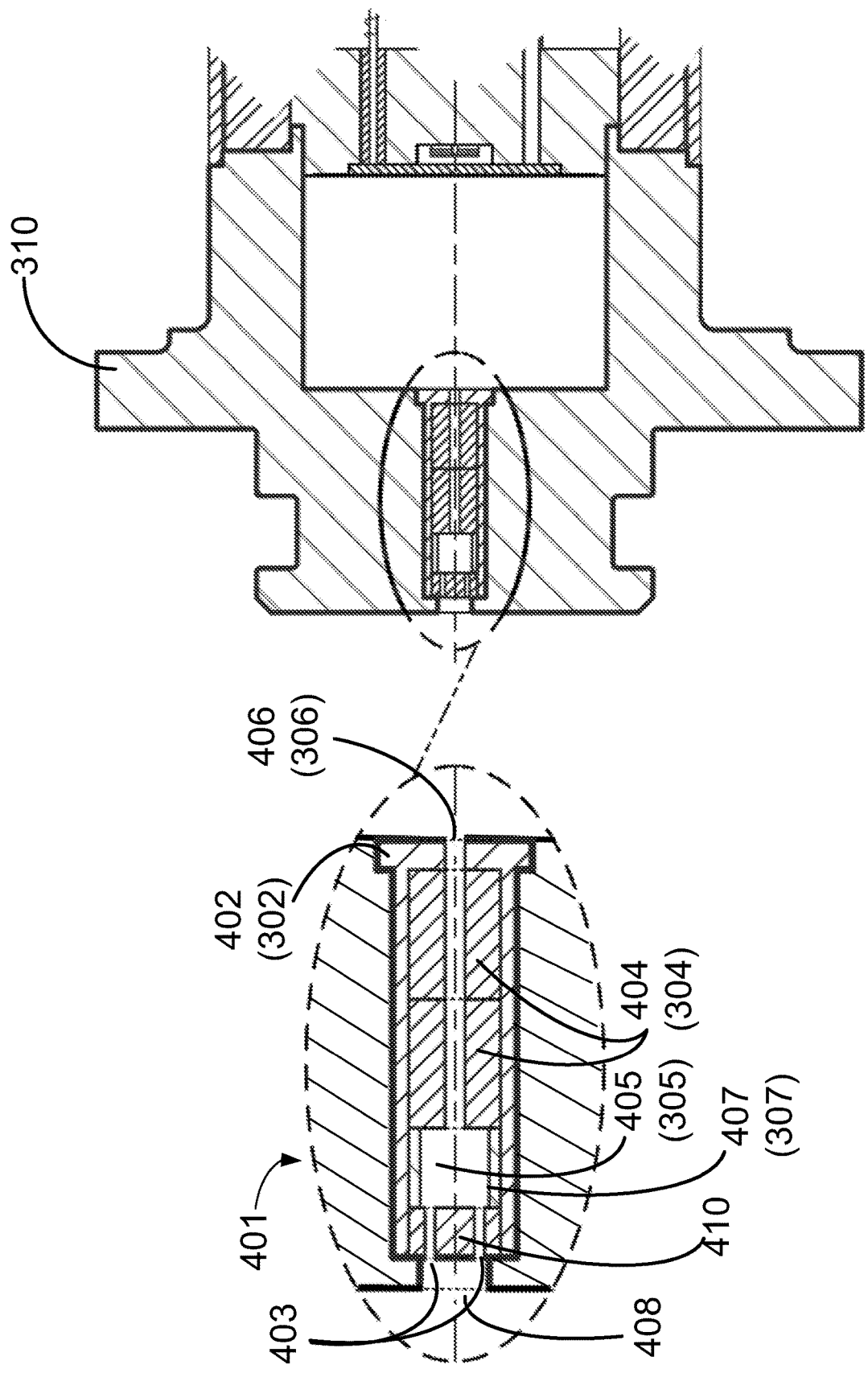
FIG. 4 illustrates a tunable pressure transducer assembly including a detailed inset view of another exemplary filter assembly, in accordance with exemplary embodiments of the disclosed technology.

FIG. 4 illustrates another exemplary implementation of the disclosed technology with parenthetical reference numerals corresponding to similar elements as described above with reference to FIG. 3. In this exemplary implementation, each section of the filter assembly 401 (including the multiple inlet apertures 403) may be formed using inserts that may be configured for a given application. For example, the inlet apertures 403 may be formed in an inlet insert 410 (rather than in the housing as discussed above with reference to FIGS. 2 and 3). In accordance with certain exemplary implementations of the disclosed technology, the filter cavity may be formed by a filter cavity insert 407, and the filter aperture 406 may be formed by stacking multiple inserts 404 405 having the desired aperture diameter. This configuration allows for maximum flexibility in selecting the proper aperture sizes and frequency response for a given application.

Figure 5:
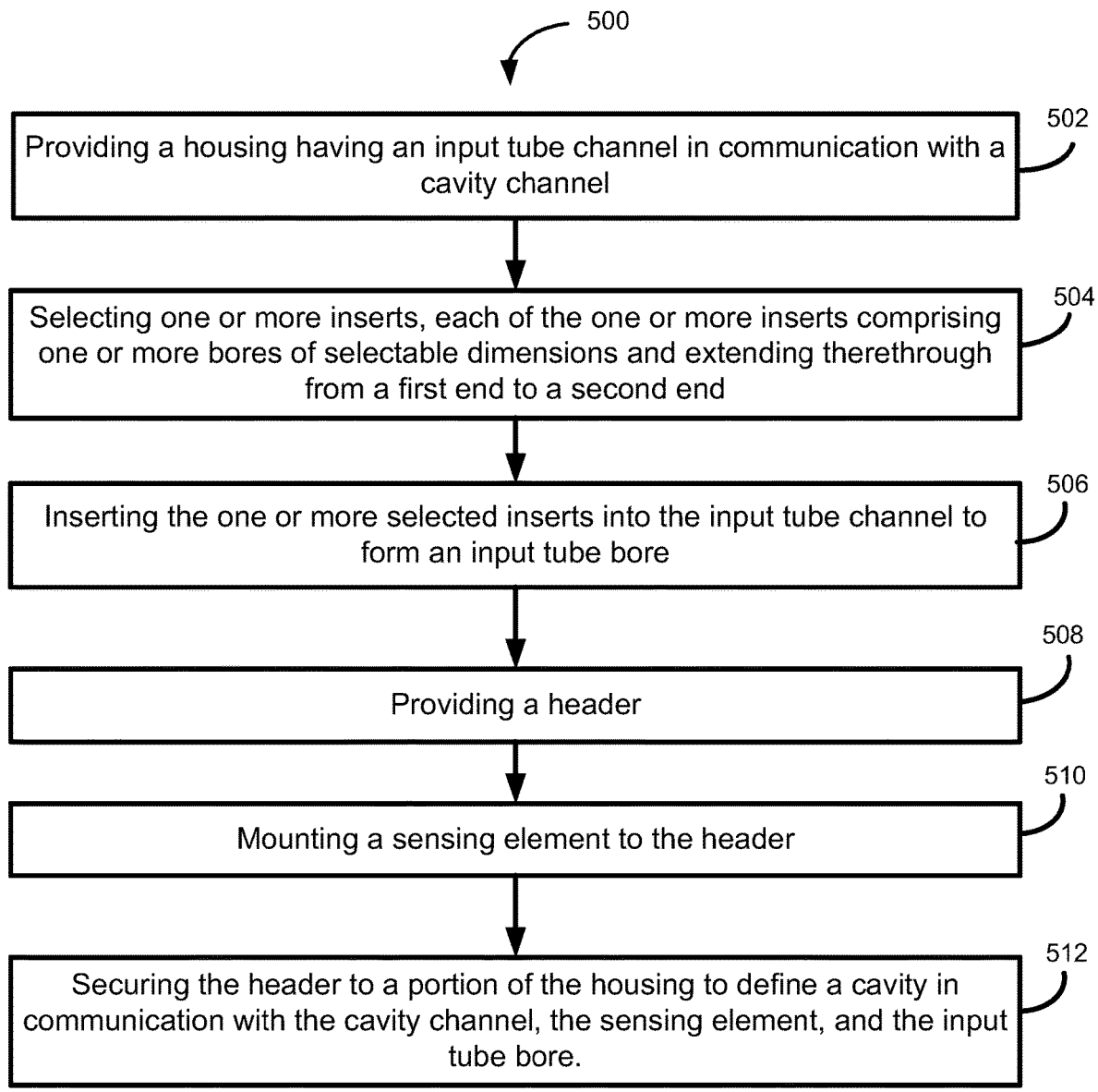
FIG. 5 is a flow diagram of a method 500, according to an example implementation of the disclosed technology.

FIG. 5 is a flow diagram of a method 500, in accordance with exemplary embodiments of the disclosed technology. In block 502, the method 500 includes providing a housing having an input tube channel in communication with a cavity channel. In block 504, the method 500 includes selecting one or more inserts, each of the one or more inserts comprising one or more apertures of selectable dimensions and extending therethrough from a first end to a second end. In block 506, the method 500 includes inserting the one or more selected inserts into the input tube channel to form a filter aperture. In block 508, the method 500 includes providing a header. In block 510, the method 500 includes mounting a sensing element to a header. In block 512, the method 500 includes securing the header to a portion of the housing to define a cavity in communication with the cavity channel, the sensing element, and the filter aperture.

Certain example implementations of the disclosed technology can include defining a plurality of inlet apertures in a front inlet face of the housing and in communication with the filter aperture.

Certain example implementations of the disclosed technology can include defining the plurality of inlet apertures in an insert.

Certain example implementations of the disclosed technology can include defining a filter cavity in the housing. Certain example implementations of the disclosed technology can include defining a filter cavity in the filter aperture.

Certain example implementations of the disclosed technology can include defining a filter cavity in an insert.

Certain example implementations of the disclosed technology can include defining a transducer cavity in the housing.

Certain example implementations of the disclosed technology can include providing an insert holder, inserting the one or more selected inserts within the insert holder, and disposing the insert holder with the one or more selected inserts into the input tube channel of the housing.

In certain example implementations, selecting and inserting the one or more inserts into the input tube channel can include selecting and inserting two or more inserts into the input tube channel, wherein an effective length of the filter aperture is defined by a sum of lengths of the apertures of the two or more inserts.

Certain example implementations of the disclosed technology can include forming a registration key feature in the one or more inserts to prevent rotation of the one or more inserts in the input tube channel.

In some implementations, disposing the insert holder with the one or more selected and inserts into the input tube channel of the housing can include press-fitting the insert holder into the input tube channel. In certain example implementations, securing the header to a portion of the housing can include welding a portion of header to the housing.

In accordance with certain example implementations of the disclosed technology, a viscosity and a ripple frequency associated with a pressure media may be utilized for selection of the one or more inserts.

Certain implementations can further include measuring, with the sensing element, an input pressure of a pressure medium, and outputting a signal corresponding to the measured input pressure.

According to an exemplary implementation of the disclosed technology, a volume of the cavity may be selectively set by selecting and/or machining the desired dimensions of the housing.

In certain exemplary implementations, one or more frequencies associated with an input pressure may be selectively dampened by selecting the selectable aperture dimensions of the one or more inserts.

Certain implementations can include drilling each of the one or more inserts to form the one or more apertures. In some implementations, electronic discharge machining techniques may be utilized to precision drill the apertures.

In a certain implementation where two or more apertures are used in each of the two or more inserts, registration key features may be utilized in the insert holder and the inserts to prevent rotation of the two or more inserts in the insert holder.

As used in the specification and the appended claims, the singular forms "a," "an," and "the" include plural referents unless the context dictates otherwise. Also, in describing the preferred embodiments, certain terminology has been utilized for the sake of clarity. It is intended that each term contemplates its broadest meaning as understood by those skilled in the art and includes all technical equivalents which operate similarly to accomplish a similar purpose.

Ranges have been expressed herein as from "about" or "approximately" one particular value and/or to "about" or "approximately" another particular value. When such a range is expressed, an embodiment includes values from the one particular value (starting point) and/or to the other particular value (ending point). In certain embodiments, the term "about" signifies a buffer of +/−5% of the said range about each said starting point and/or ending point.

As used herein, the terms "comprising" or "containing" or "including" mean that at least the named element or method step is present in the composition or article or method, but does not exclude the presence of other compounds, materials, particles, method steps, even if the other such compounds, material, particles, method steps have the same function as what is named.

Numerous characteristics and advantages have been set forth in the foregoing description, together with details of structure and function. While the disclosed technology has been disclosed in several forms, it will be apparent to those skilled in the art that many modifications, additions, and deletions, especially in matters of shape, size, and arrangement of parts, can be made therein without departing from the spirit and scope of the disclosed technology and its equivalents as set forth in the following claims. Therefore, other modifications or embodiments as may be suggested by the teachings herein are particularly reserved as they fall within the breadth and scope of the claims here appended.

We claim:

1. A tunable pressure transducer, comprising:
a housing that includes:
an input tube channel; and
a transducer cavity in communication with the input tube channel;
an input tube filter assembly disposed in the input tube channel and in communication with the transducer cavity, the input tube filter assembly comprising:
one or more inserts disposed in the input tube channel, the one or more inserts comprising one or more apertures having selectable dimensions and extending therethrough from a first end to a second end, wherein the one or more inserts define one or more of a filter aperture, a filter cavity, and a first plurality of inlet apertures; and
wherein the input tube filter assembly is selectively tunable by selection and installation of the one or more inserts.

2. The tunable pressure transducer of claim 1, wherein a second plurality of inlet apertures are defined in a front inlet face portion of the housing, and wherein the second plurality of inlet apertures are configured with a diameter smaller than a diameter of the filter aperture.

3. The tunable pressure transducer of claim 1, wherein the first plurality of inlet apertures are configured with a diameter smaller than a diameter of the filter aperture.

4. The tunable pressure transducer of claim 1, further comprising an insert holder disposed in the input tube channel, wherein the one or more inserts are disposed in the insert holder.

5. The tunable pressure transducer of claim 1, further comprising:
a header positioned within at least a portion of the transducer cavity of the housing, the transducer cavity in communication with the input tube channel; and
a sensing element disposed on the header and adjacent to the transducer cavity.

6. The tunable pressure transducer of claim 5, wherein the input tube filter assembly is configured to control an application of applied pressure to the sensing element, and wherein the input tube filter assembly and cavity form an adjustable low pass mechanical filter configured to receive and filter an input pressure to provide a filtered pressure to the sensing element.

7. The tunable pressure transducer of claim 1, wherein the one or more inserts comprise two or more inserts, and an effective length of the filter aperture is defined by a sum of lengths of the apertures of the two or more inserts.

8. The tunable pressure transducer of claim 1, wherein the one or more inserts are selected to provide oscillation dampening of an applied pressure media.

9. The tunable pressure transducer of claim 1, wherein one or more of an effective length of the filter aperture and a volume of the transducer cavity are configured to substantially reduce high-frequency pressure ripples and allow static and quasi-static pressures to pass.

10. The tunable pressure transducer of claim 1, wherein two or more inserts are disposed in the input tube channel when aperture dimensions below a predetermined threshold diameter are selected.

11. The tunable pressure transducer of claim 1, wherein an effective volume of the transducer cavity is selectively configurable by the one or more inserts and a volume of the transducer cavity.

12. The tunable pressure transducer of claim 1, wherein the filter cavity is defined by the input tube channel and one or more adjacent inserts.

13. A method, comprising:
providing a housing having an input tube channel in communication with a cavity channel;
selecting one or more inserts, each of the one or more inserts comprising one or more apertures of selectable dimensions and extending therethrough from a first end to a second end;
inserting the one or more inserts into the input tube channel to form a filter aperture;
providing a header;
mounting a sensing element to a header; and
securing the header to a portion of the housing to define a cavity in communication with the cavity channel, the sensing element, and the filter aperture.

14. The method of claim 13, further comprising:
providing an insert holder;
inserting the one or more inserts within the insert holder; and
disposing the insert holder and the one or more inserts into the input tube channel of the housing.

15. The method of claim 14, wherein disposing the insert holder with the one or more selected and inserts into the input tube channel of the housing comprising press-fitting the insert holder into the input tube channel.

16. The method of claim 13, wherein the one or more inserts comprise two or more inserts, and an effective length of the filter aperture is defined by a sum of lengths of apertures of the two or more inserts.

17. The method of claim 13, further comprising forming a registration key feature in the one or more inserts to prevent rotation of the one or more inserts in the input tube channel.

18. The method of claim 13, wherein securing the header to a portion of the housing comprises welding a portion of header to the housing.

19. The method of claim 13, wherein a viscosity and a ripple frequency associated with a pressure media utilized for a selection of the one or more inserts.

20. The method of claim 13, further comprising:
measuring, with the sensing element, an input pressure of a pressure medium; and
outputting a signal corresponding to a measured input pressure.

* * * * *